Oct. 8, 1940.   C. W. HINES   2,216,739
WELDING APPARATUS (HINGED)
Filed June 17, 1939
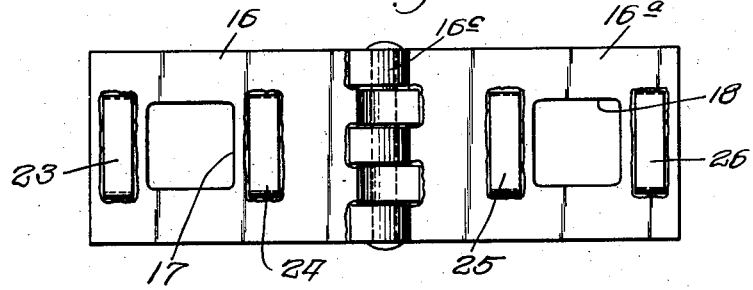
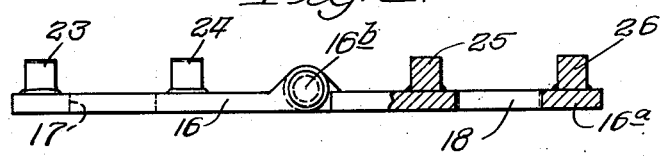
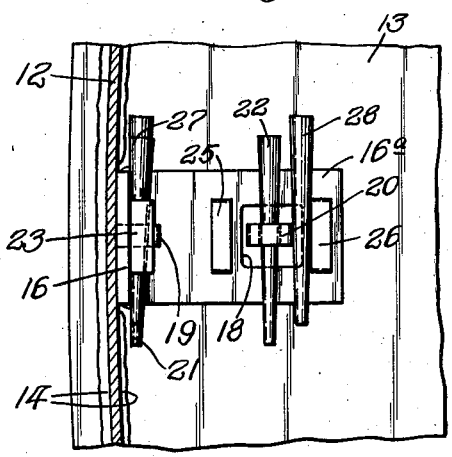
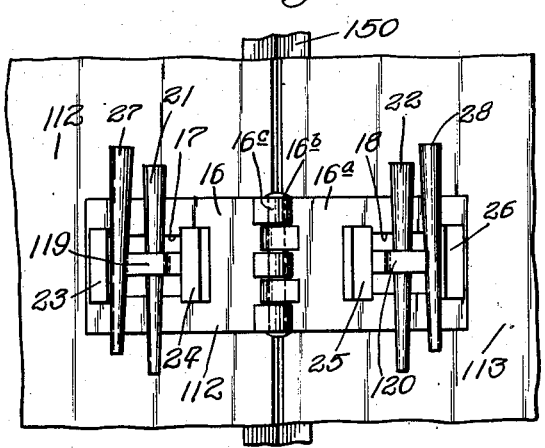
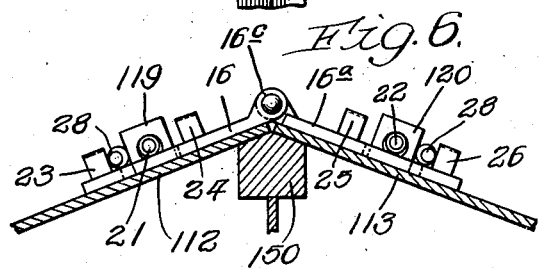
Inventor:
Clarence W. Hines Patented Oct. 8, 1940

2,216,739

UNITED STATES PATENT OFFICE 2,216,739

WELDING APPARATUS (HINGED)

Clarence W. Hines, Chicago, Ill., assignor to Chicago Bridge & Iron Company, Chicago, Ill., a corporation of Illinois Application June 17, 1939, Serial No. 279,764

3 Claims. (Cl. 113—99)

This invention relates to improvements in welding apparatus and, more especially, such apparatus adapted for use in the welding of steel sheets or plates.

The invention constitutes an improvement upon the apparatus shown in my earlier patent, Reissue No. 21,101, dated May 30, 1939.

In the manufacture of steel tanks, and the like, using sheets of steel, it is desirable in accordance with present practice to butt-weld the edges of the sheets. In making tanks in this way, difficulty has been encountered in aligning and holding the sheets to properly place and locate them preparatory to the welding of the edges. By the use of my improved apparatus, the sheets of steel may be properly aligned and held with their edges in proper position for welding. Although butt-welding has been specifically mentioned, my improved apparatus may also be used for welding the edge of one sheet to the face of an adjoining sheet. The term "butt-welding" used above is employed in a sense broad enough to cover such welding which at least welds the butt end of one of the sheets.

The principal improvement in my present device over that shown in my earlier patent is the providing of hinged plates so that the sheets to be welded need not necessarily be in the same plane but may be angularly adjusted with respect to each other, as desired. The new device is particularly useful, therefore, in connection with the welding of a side wall sheet to a bottom sheet so that the two plates can be held substantially at right angles to each other. In all cases where two sheets or plates are to be welded in a particular angular relation, my improved apparatus may be employed to hold and position the sheets, as desired.

My improved apparatus is cheap to manufacture, strong and rugged and greatly facilitates the welding of various members, especially the edges of steel sheets, as mentioned above.

Other features and advantages of my invention will appear more fully as I proceed with my specification.

In that form of device embodying the features of my invention shown in the accompanying drawing—

Figure 1 is a top plan view; Fig. 2 is a view in side elevation partly in section; Fig. 3 is a top plan view showing the apparatus employed in welding a side wall sheet or plate to a bottom sheet or plate; Fig. 4 is a similar view in side elevation; Fig. 5 is a top plan view showing the butt-welding of the edges of two sheets at an angle of about 140°; and Fig. 6 is a similar view in side elevation.

As shown in the drawing, 12 may indicate a sheet or plate of steel forming the side wall, for example, of a cylindrical tank and 13, one of the bottom sheets. The bottom edge of the side sheet 12 meets the bottom 13 at right angles, as shown in Fig. 4, so that the bottom sheet has a projecting margin 13ᵃ outside of the side sheet 12. 14, 14 indicate the welding of the sheets.

The apparatus includes primarily two rectangular plates 16 and 16ᵃ hinged together at adjacent edges by means of the pin 16ᵇ inserted through the loops 16ᶜ carried by the plates. Although I have illustrated one form of hinge joint, it is to be understood that the two plates may be hinged together in any convenient manner.

Each of the plates is provided with a square hole 17 and 18, respectively, adapted to receive apertured holding lugs 19 and 20 on the sheets 12 and 13. 21 and 22 indicate wedges adapted to be driven through the apertures in the holding lugs 19 and 20 to draw the sheets 12 and 13 against the two plates 16 and 16ᵃ, respectively, to bring the sheets into the general position shown in Figs. 3 and 4. The plate 16 is provided with bars 23 and 24 at the sides of the aperture 17 and the plate 16ᵃ is provided with similar bars 25 and 26 at the sides of the aperture 18. The sides of these bars form shoulders adjacent the apertures 17 and 18. 27 indicates a wedge adapted to be driven between the bar 23 and holding lug 19 to shift the sheet 12 downwardly or laterally with respect to the plate 16. This wedge could also be inserted between the bar 24 and holding lug 19 to shift the sheet 12 upwardly, if desired. 28 indicates a wedge inserted between the bar 26 and holding lug 20 to shift the bottom sheet to the left or laterally with respect to the plate 16 to the desired position. It is obvious also that this wedge could be applied between the bar 25 and lug 20 to shift the sheet 13 to the right. I am using the term "laterally" to indicate the shifting of a sheet in any direction with respect to the adjacent plate 16 or 16ᵃ and in a plane parallel therewith. It will be seen that by use of the wedges described, the sheets may be properly positioned. The right angle relationship between the sheets is accomplished by the hinging of the plates 16 and 16ᵃ at 16ᶜ.

In Figs. 5 and 6, the apparatus is shown as welding the sheets 112 and 113 when lying at an angle of substantially 140°. Here the edges of the sheets may be resting upon a support 150 and the plates 16 and 16ᵃ have been adjusted at their hinged connection to give the desired angularity. The plates 112 and 113 carry the lugs 119 and 120, respectively, which are inserted through the holes 17 and 18 in the plates 16 and 16ª. The wedges 21 and 22 are employed to hold the sheets 112 and 113 against the plates 16 and 16ª, respectively, and the wedges 27 and 28 are employed between the lugs 119 and 120 and the bars 23 and 26, respectively, to shift the edges of the sheets toward each other to the desired position for welding.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Welding apparatus, including: a pair of plates hinged together and apertured to receive apertured holding lugs on members to be welded together; wedges adapted to be driven through the apertures in the holding lugs to draw the members against the plates the edge of at least one member being adjacent the hinge; a shoulder on one of the plates adjacent the aperture in it; and a wedge adapted to be driven between a holding lug and said shoulder to shift the member laterally with respect to said plate.

2. Welding apparatus, including: apertured holding lugs adapted to be attached to members to be welded together; a pair of plates hinged together and apertured to receive said apertured holding lugs when attached to members to be welded together; wedges adapted to be driven through the apertures in the holding lugs to draw the members against the plates the edge of at least one member being adjacent the hinge; a shoulder on one of the plates adjacent the aperture in it; and a wedge adapted to be driven between a holding lug and said shoulder to shift the member laterally with respect to said plate.

3. Welding apparatus, including: a plate apertured to receive an apertured holding lug on a member to be welded to another member; a wedge adapted to be driven through said aperture in said holding lug to draw said member against said plate; a shoulder on said plate adjacent said aperture; a wedge adapted to be driven between said holding lug and said shoulder to shift said member laterally with respect to said plate when said member is drawn against said plate; a second plate hinged to said first-mentioned plate; and means for attaching said second plate to said other member, the edge of at least one of said members being adjacent said hinge when the members are attached to the plate.

CLARENCE W. HINES.